Oct. 5, 1965  E. M. LAU  3,210,495
BIN LEVEL INDICATING DEVICE
Filed Nov. 2, 1962  2 Sheets-Sheet 1
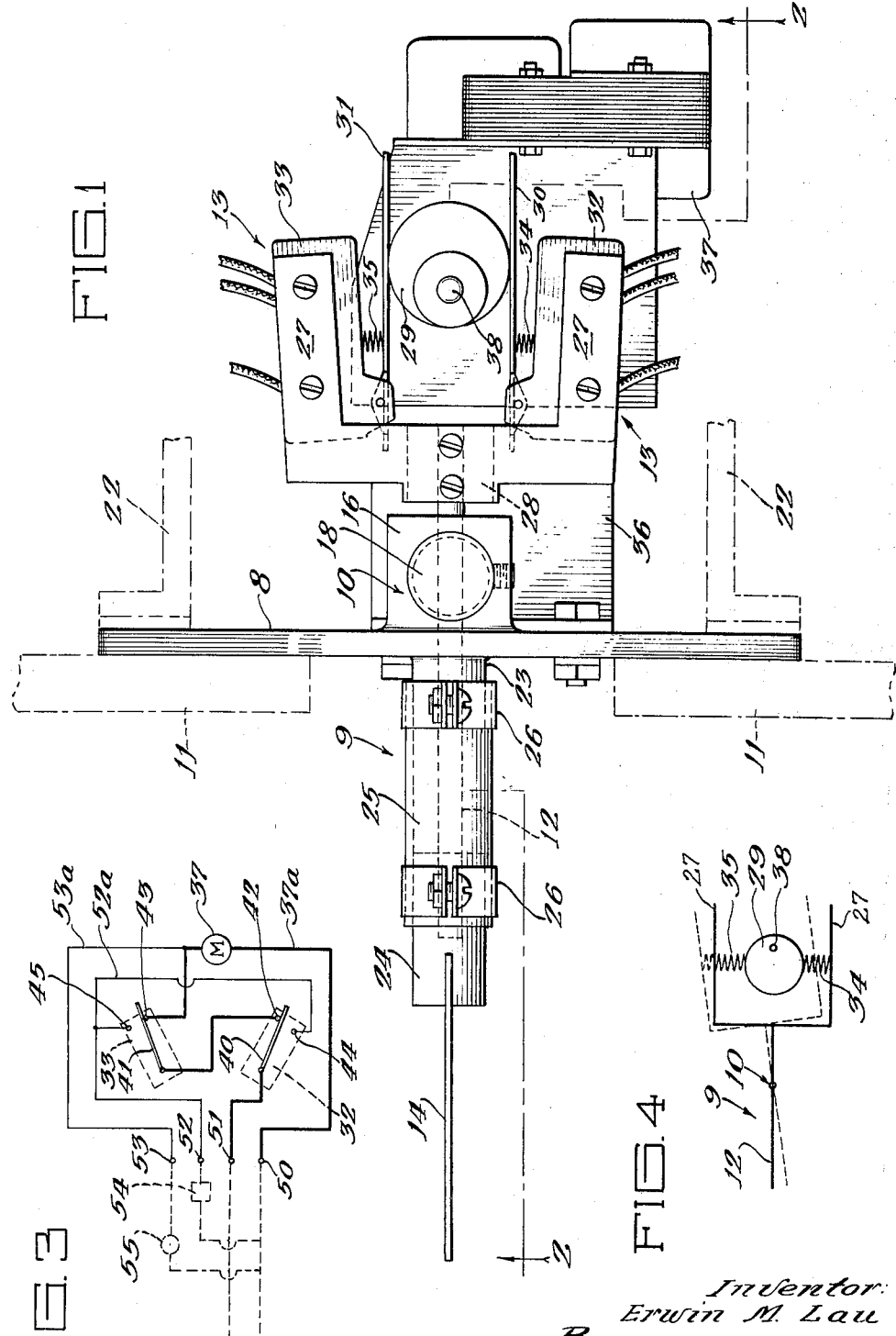
Inventor:
Erwin M. Lau
By Zahl, Baker, York,
Jones & Dithmar
Attorneys

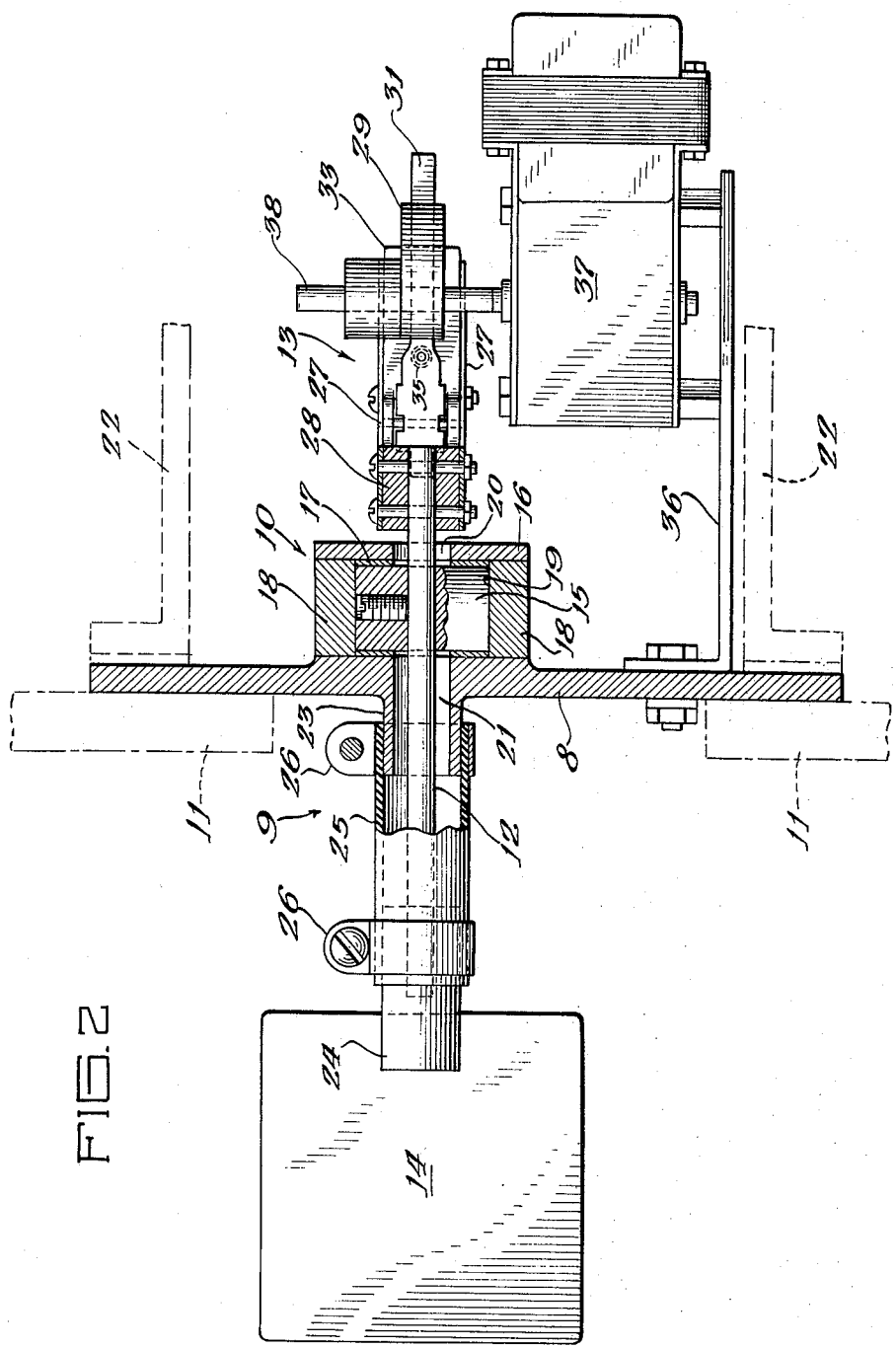

United States Patent Office
3,210,495
Patented Oct. 5, 1965

3,210,495
BIN LEVEL INDICATING DEVICE
Erwin M. Lau, Dolton, Ill., assignor to Black Products Co., Chicago, Ill., a corporation of Illinois
Filed Nov. 2, 1962, Ser. No. 234,991
13 Claims. (Cl. 200—61.21)

This invention relates to a level responsive device which is particularly suitable for use in connection with powdered and granular materials.

Devices of this type include a sensing arm or rod which projects into the bin in which the powdered or granular materials are contained. The outer end of the sensing arm may be provided with a paddle or other enlarged portion. Mechanism is provided for rotating or oscillating the sensing arm; when the level of the powdered or granular material within the bin increases so as to interfere with the rotation or oscillation of the paddle, the paddle is stalled, and the stalling of the paddle causes the mechanism to operate a control switch or otherwise to give a signal so that the feeding of material into the bin can be cut off.

The present invention is an improvement of the level responsive device shown in my application, Serial No. 118,119 filed June 19, 1961, which is directed to a device which can be mounted either on the side wall of the bin, with the sensing arm projecting horizontally, or on the top wall of the bin, with the sensing arm projecting vertically downward.

As pointed out in the aforesaid copending application, the stalling action of the paddle is more positive if the movement of the sensing element is substantially horizontal at the point of stalling, rather than vertical. In my earlier arrangement, when the device was mounted in the top wall, the movement of the sensing element was horizontal at all times, but when mounted in the side wall, the desired horizontal movement was present only during a portion of each cycle of operation.

It is an object of my invention to provide an improved level responsive device in which the movement of the sensing element is substantially horizontal at all times, irrespective of whether the device is installed in the top wall or the side wall of the bin.

To elaborate the nature of the improved action, it can be pointed out that the sensing element is rotated or oscillated at a relatively slow rate such as from one to ten or fifteen cycles per minute. Even at the faster rate, a complete cycle will occupy from four to six seconds. In some installations as, for example in bag filling machines, the rate of feed is very rapid with the result that the rate of change of level may be as great or greater than the rate of vertical movement of the sensing element, with the result that the accuracy of the level responsive device is diminished. For instance, if the amplitude of vertical oscillation, either with a circular path or a linear path, is 4 inches, with a rapid feed, the stalling can occur at any point within the 4-inch amplitude of movement.

According to the present invention, the sensing element is mounted for freedom of movement in a horizontal direction only, when the device is installed in the side wall of the bin. Therefore, the elevation of the sensing element is always constant, thus giving a much more accurate response. When mounted in the top wall the angular amplitude is comparatively small, for example 15° or less, with the result that even though the sensing element moves in an arcuate path, the path is substantially horizontal, the vertical component being negligible.

Another object of my invention is to provide for a level responsive device of the type indicated, a low friction bearing means for the sensing arm which provides improved sensitivity, together with sealing means whereby the material within the bin cannot seep into or clog the bearing.

A further object is to provide a flame-proof bearing means which reduces the explosion hazard in certain environments.

A still further object is to provide an improved switch actuating mechanism which is equally effective upon relative displacement of the parts in either direction.

Other objects, features and advantages will become apparent as the description proceeds.

With reference now to the drawings in which like reference numerals designate like parts:

FIG. 1 is a plan view showing a preferred embodiment of my invention;

FIG. 2 is a vertical section taken along line 2—2 of FIG. 1;

FIG. 3 is a circuit diagram; and

FIG. 4 is a diagram illustrating the operation.

With reference now to FIGS. 1 and 2, the device comprises a mounting plate 8, and a yoke assembly 9 which is pivotally mounted with respect to the plate 8 by bearing means 10. The devices will be described with respect to installation in the side wall 11 of a bin, in which event the plate 8 is vertically disposed and the yoke assembly 9 is horizontally disposed.

The yoke assembly 9 includes a sensing rod 12 having two yoke arms 13 at one end, and a sensing element 14 at the other end, which may be in the form of a vertically disposed paddle located within the bin.

The bearing means 10 comprises a pivot post 15, a bearing block 16, and an oilite bushing 17 disposed between the two. The sensing rod 12 extends through and is secured to the pivot post 15. The bearing block 16 is disposed on the rear surface of the mounting plate 8 and is either integrally formed with the plate as shown or may be suitably welded thereto.

The block 16 has a vertical bore therein to accommodate the pivot post 15, the latter being confined within the bore by retainer plugs 18. The elements 15 and 18 have machined surfaces so that the upper surface 19 of the lower retainer plug 18 provides a low friction support for the yoke assembly 9, in the nature of a thrust bearing.

The oilite bushing 17 takes up the lateral forces encountered due to the cantilevered mounting, and which are substantial in the case of a sensing rod of some surface when the device is installed in the top wall of the length, and it also provides a vertically reacting bearing bin, as previously mention.

The block 16 and bushing 17 are provided with openings 20 and 21 through which the sensing arm 13 extends, the bushing being continuous except for such openings. The use of cylindrical bearing elements permits the parts to be made to very close tolerances; any operating clearance between the bearing surfaces 15 and 17 would provide a labyrinthine path, and the combination of these two factors provides an effective flame barrier between the interior of the bin and the mechanism disposed to the right of the mounting plate. It is contemplated that the mechanism be enclosed by sealed housing 22 to provide an explosionproof construction.

The opening 19 is surrounded by a collar 23 which projects forwardly of the front surface of the mounting plate 8. The paddle 14 is provided with a cylindrical hub-like member 24 of the same diameter as the outer diameter of the collar 23. A flexible tube 25, of rubber or the like extends between and overlaps the collar 23 and the hub 24 and is firmly secured thereto by clamps 26.

Thus, a low friction explosionproof bearing means is provided for pivotally mounting the yoke assembly 9 for movement in either a horizontal or vertical plane, and the flexible tube 25 seals said bearing means 10 against entry into the bearing of powder or other material which may be disposed within the bin.

The yoke arms 13 are in the form of two vertically spaced yoke plates 27 which are secured to each other and to the sensing rod 13 by a spacer 28 and suitable screws. A cam 29 is located between the yoke arms 13.

Mounted on each yoke arm is a displaceable follower 30, 31 for engagement with the cam 29. Also mounted on each arm is a switch device, such as a microswitch 32, 33, each of which is located between and secured to the yoke plates 27. Such switch devices are conventionally equipped with a pivoted actuating arm or blade which, in the arrangement shown, serves as the displaceable follower 30, 31. Springs 34, 35, confined between each blade and the switch body urge the blades into engagement with the periphery of cam 29.

Referring now to the diagram of FIG. 4, it will be observed that the springs 34 and 35 permit a relative displacement of the yoke assembly 9 with respect to the cam periphery, as indicated by the broken line position of the parts. Nevertheless, the springs serve to maintain the yoke assembly in a centered position with respect to the cam periphery at any given instant. For example, the displacement in the direction shown in FIG. 4 is against the force exerted by the spring 34, with the result that the parts seek to return to the centered position shown in solid lines.

A bracket 36 extends rearwardly from the mounting plate 8 and supports a motor 37, preferably a low power geared synchronous motor, which drives the cam 29 through a cam shaft 38.

Thus rotation of the cam 29 will cause oscillation of the yoke assembly 9 with respect to the axis of bearing means 10 which, in the arrangement shown, is a horizontal oscillation about a vertical axis. During such oscillation, the yoke assembly is maintained in a centered position with respect to the cam periphery, but nevertheless, a relative displacement of the parts is permitted by virtue of the springs 34 and 35, and such relative displacement will occur when the paddle 14 is stalled by an increase in the level of the material in the bin which interferes with the lateral movement of the paddle.

Each of the switches 32 and 33 is a single pole double throw switch, having a movable contact 40, 41 which is actuated by the displacement of the blade or follower 30, 31, there being a suitable mechanical connection between the two, such as a plunger, not shown.

As shown in the circuit diagram of FIG. 3, the switches 32, 33 each have a normally closed contact 42, 43 and a normally open contact 44, 45 respectively, the switch mechanism including conventional means for biasing the movable contact 40, 41 into engagement with the normally closed contact 42, 43. A lead 46 connects the normally closed contact 42 of one switch with the movable contact 41 of the other, thus providing a series connection between the two switches, when in the normal position shown.

As shown, the circuit has four terminals 50–53 of which terminals 50 and 51 are adapted to be connected to a suitable source of power. A lead extends between terminal 51 and the movable contact 40, and another lead extends between normally closed contact 43 and a junction point 47. The motor 37 is connected between junction 47 and terminal 50. The above mentioned parts thus provide an operating circuit 37a which is shown in heavy lines in FIG. 3, and which includes the terminal 51, the series connected switches 32, 33, junction point 47, motor 37, and terminal 50. The arrangement is such that the actuation of either microswitch will open the operating circuit 37a.

The normally open contacts 44, 45 are connected in parallel to the terminal 52 to provide for a normally open signal circuit 52a, and the junction point 57 is connected to the terminal 53 to provide for a normally closed signal circuit 53a.

The terminals 52 and 53 provide means for completing either a normally de-energized or a normally energized signal circuit, to be actuated by my improved level responsive device. For instance, as shown in broken lines in FIG. 3, a normally de-energized control device 54 may be connected between terminals 52 and 50 to provide for cutting off the feed of material into the bin when the material level reaches a predetermined point. Also, a normally energized signal 55, such as a red light, may be connected between terminals 53 and 50 to indicate that material is being fed into the bin. In some situations, it may be more convenient to utilize a normally energized signal to control the feeding operation.

To summarize the operation which has been detailed in connection with the description of the various parts and subassemblies, when the device is mounted in the side wall of a bin as shown herein, the movement of the paddle 14 will always be in a horizontal path. Thus, as soon as the level of the material within the bin reaches an elevation which corresponds with the lower edge of the paddle 14, there will be interference which causes a stalling of the paddle, and this will occur irrespective of whether the paddle is moving in one direction or the other.

Up to this time, the springs 34 and 35 have maintained a yoke assembly 9 in a relatively centered position in which the switches 32 and 33 are unoperated, thus establishing the operating circuit 37a which causes the oscillation of the yoke assembly. However, as soon as the paddle 14 is stalled, continued rotation of the cam 29 results in a relative displacement of the parts which will cause operation of one of the switches to open the operating circuit, with the result that the cam comes to a stop.

Irrespective of which switch is operated, the terminal 52 will be energized, thus completing the signal circuit 52a and energizing the control device 54. In the alternative, the de-energization of the terminal 53 can be utilized to shut off the feed, or to open a discharge gate, or to provide a warning signal.

The cam 29 is preferably rotated at a comparatively slow speed, such as twelve revolutions per minute.

When the level responsive device is mounted in the top wall of the bin, the operation is substantially the same, the paddle 14 being disposed in a vertical plane, but this time it is the remote edge with which the material level interferes.

In either type of installation, the sensing rod 12 may be of any desired length, and of course when mounted vertically, the length of the rod determines the predetermined bin level.

The bearing construction shown is satisfactory for either vertical or horizontal mounting, and in both instances it provides a flameproof barrier which greatly reduces the explosive hazard when my device is used in connection with powdered organic materials.

The flexible sleeve 25 maintain the bearing means 10 free from all dust, and contributes to long bearing life and trouble free operation.

Although only a preferred embodiment of my invention has been shown and described herein, it will be understood that various modifications and changes may be made in the construction shown without departing from the spirit of my invention, as pointed out by the appended claims.

I claim:

1. A level responsive device comprising a mounting plate, a yoke assembly including a sensing rod having a sensing element at one end and two yoke arms at the other end, bearing means for mounting said sensing rod on said mounting plate at an intermediate point for oscillation in a given plane, said sensing arm extending through said mounting plate, a cam disposed between said yoke arms, a cam follower pivotally mounted on each yoke arm for engaging the opposite sides of said cam, spring means urging each of said cam followers into engagement with said cam to maintain said yoke assembly in a centered position relative to the periphery of said cam, but permitting relative displacement of said yoke assembly with respect to said cam periphery, means for driving said cam to cause oscillation of said yoke assembly while the latter is maintained in said relatively centered position, and switch means mounted on said yoke arms and adapted for actuation by said relative displacement in either direction, the displacement of said yoke assembly from said relatively centered position due to the blocking of the movement of said sensing element during the rotation of said cam will actuate said switch means.

2. A level responsive device comprising a mounting plate, a yoke assembly including a sensing rod having a sensing element at one end and two yoke arms at the other end, bearing means for mounting said sensing rod on said mounting plate at an intermediate point for oscillation in a given plane, said sensing arm extending through said mounting plate, a cam disposed between said yoke arms, a cam follower pivotally mounted on each yoke arm for engaging the opposite sides of said cam, spring means urging each of said cam followers into engagement with said cam to maintain said yoke assembly in a centered position relative to the periphery of said cam, but permitting relative displacement of said yoke assembly with respect to said cam periphery, means for driving said cam to cause oscillation of said yoke assembly while the latter is maintained in said relatively centered position, and switch means mounted on said yoke arms and adapted for actuation by said relative displacement in either direction, the displacement of said yoke assembly from said relatively centered position due to the blocking of the movement of said sensing element during the rotation of said cam will actuate said switch means, said bearing means comprising a bearing block located on said mounting plate and having a bore formed therein, a pivot post journalled in said bore, a cylindrical bushing disposed between said bearing block and said pivot post, said bearing block and said bushing having oppositely disposed aligned openings formed therein, said sensing rod extending through said openings, and extending through and being secured to said pivot post, and retainer plugs closing the ends of said bore and abutting the end surfaces of said pivot post whereby the operating clearance between the bearing surfaces forms a labyrinthine path between opposite sides of said mounting plate.

3. A level responsive device as claimed in claim 1 which includes a flexible sleeve extending from said sensing element to said mounting plate, and sealed at either end to each to provide a bearing seal.

4. A level responsive device as claimed in claim 1 which includes a motor for driving said cam, said switch means including a first and second double throw switch each having a movable contact, a normally closed contact, and a normally open contact, and including a lead extending from the normally closed contact of the first switch to the movable contact of the second switch for providing a series connection between said switches, an operating circuit including (a) terminals for connection to a power source, (b) said series connected switches when normally closed, and (c) said motor, and a signal terminal connected to said normally open contacts, whereby actuation of one of said switches will open said operating circuit and cause said signal terminal to be energized.

5. A level responsive device as claimed in claim 1 which includes a motor for driving said cam, said switch means including a first and second double throw switch each having a movable contact, and a normally closed contact, and including a lead extending from the normally closed contact of the first switch to the movable contact of the second switch for providing a series connection between said switches, an operating circuit including terminals for connection to a power source, said series connected switches when normally closed, and said motor, and a normally energized signal terminal connected to said operating circuit at a point between said series connected switches and said motor, whereby actuation of one of said switches will open said operating circuit and cause said signal terminal to be de-energized.

6. A level responsive device as claimed in claim 1 which includes a motor for driving said cam, said switch means including a first and second double throw switch each having a movable contact, a normally closed contact, and a normally open contact, and including a lead extending from the normally closed contact of the first switch to the movable contact of the second switch for providing a series connection between said switches, an operating circuit including terminals for connection to a power source, said series connected switches when normally closed, and said motor, a first signal terminal connected to said normally open contacts, and a second signal terminal connected to said operating circuit at a point between said motor and said switch control means.

7. A level responsive device comprising a mounting plate, a yoke assembly including a sensing rod having a sensing element at one end and two yoke arms at the other end, bearing means for mounting said sensing rod on said mounting plate at an intermediate point for oscillation in a given plane, said sensing arm extending through said mounting plate, a switch mounted on each of said yoke arms, and each having a pivoted switch actuating blade, a cam disposed between said switch blades, spring means urging each of said switch blades into engagement with said cam to maintain said yoke assembly in a centered position relative to the periphery of said cam, but permitting relative displacement of said yoke assembly wtih respect to said cam periphery, means for driving said cam to cause oscillation of said yoke assembly while the latter is maintained in said relatively centered position, one or the other of said switch means being adapted for actuation by said relative displacement in either direction, whereby the displacement of said yoke assembly from said relatively centered position due to the blocking of the movement of said sensing element during the rotation of said cam will actuate one of said switches.

8. A level responsive device adapted for installation in the side wall of a bin or the like, and responsive to the increase in the level of powdered or granular material contained within said bin beyond a predetermined elevation, comprising an apertured mounting plate adapted to overlie an opening in the bin wall, a yoke assembly pivotally mounted on said mounting plate, and including a sensing rod having its outer end extending through said mounting plate and two yoke arms at the other end, cam means disposed between said yoke arms for oscillating said yoke assembly, means responsive to a relative displacement in either direction of said yoke assembly with respect to the periphery of said cam for actuating a signal, a vertically disposed paddle mounted on said outer end of said sensing rod, and bearing means for confining the movement of said paddle to oscillation along a horizontal path whereby the elevation of said paddle is constant, an increase in the level of said material causing an interference with said paddle oscillation which is effective to cause said relative displacement at any point in said path.

9. A level responsive device adapted for installation in either the top wall or the side wall of a bin or the like, and responsive to the increase in the level of powdered or granular material contained within said bin beyond a predetermined elevation, comprising an apertured mounting plate adapted to overlie an opening in a bin wall, a yoke assembly pivotally mounted on said mounting plate, and including a sensing rod having its outer end extending through said mounting plate and two yoke arms at the other end, cam means disposed between said yoke arms for oscillating said yoke assembly, and means responsive to a relative displacement of said yoke assembly in either direction with respect to the periphery of said cam for actuating a signal, whereby an increase in the said level which interferes with the movement of said outer end of said sensing rod will result in said relative displacement to cause operation of said signal actuating means.

10. A level responsive device as claimed in claim 1 which includes a flexible sleeve extending from said sensing element to said mounting plate, and sealed at either end to each to provide a bearing seal.

11. A level responsive device as claimed in claim 7 which includes a flexible sleeve extending from said sensing element to said mounting plate, and sealed at either end to each to provide a bearing seal.

12. A level responsive device as claimed in claim 8 which includes a flexible sleeve extending from said paddle to said mounting plate, and sealed at either end to each to provide a bearing seal.

13. A level responsive device as claimed in claim 9 which includes a sleeve surrounding said outer end of said sensing rod, the outer end of said sleeve being sealed to said sensing rod, and the inner end sealed to said mounting plate.

References Cited by the Examiner
UNITED STATES PATENTS

| | | | |
|---|---|---|---|
| 1,118,411 | 11/14 | Granz | 74—54 |
| 2,116,075 | 5/38 | Lenhart | 200—61.21 |
| 2,851,553 | 9/58 | Grostick | 200—61.21 |
| 2,909,766 | 10/59 | Bozich | 200—61.21 |
| 2,935,877 | 5/60 | Sealey | 74—54 |
| 2,963,201 | 12/60 | Westlin | 200—61.21 |

BERNARD A. GILHEANY, *Primary Examiner.*
ROBERT K. SCHAEFER, *Examiner.*